United States Patent
Meckler

[11] Patent Number: 5,816,070
[45] Date of Patent: Oct. 6, 1998

[54] ENHANCED LITHIUM BROMIDE ABSORPTION CYCLE WATER VAPOR RECOMPRESSION ABSORBER

[76] Inventor: Milton Meckler, 930 20th St. Apt. 2, Santa Monica, Calif. 90403

[21] Appl. No.: 756,216

[22] Filed: Nov. 25, 1996

Related U.S. Application Data

[63] Continuation-in-part of Ser. No. 427,852, Apr. 24, 1995, Pat. No. 5,600,967.
[51] Int. Cl.$^6$ ..................................................... F25B 15/00
[52] U.S. Cl. ............................................... 62/476; 62/109
[58] Field of Search .............................. 62/476, 485, 101, 62/109, 484, 486

[56] References Cited

U.S. PATENT DOCUMENTS

| | | | |
|---|---|---|---|
| 4,551,991 | 11/1985 | Miyoshi et al. | 62/476 |
| 4,553,409 | 11/1985 | Furukawa | 62/476 |
| 5,600,967 | 2/1997 | Meckler | 62/476 |

*Primary Examiner*—William Doerrler
*Attorney, Agent, or Firm*—William H. Maxwell

[57] ABSTRACT

A Vapor Recompression Absorber (VRA) for reprocessing a concentrated solution of water refrigerant and Lithium-Bromide salt from at least one solution concentrator in a closed chiller system, the VRA being comprised of an upper heat-in absorption chamber and a lower heat-out evaporation chamber and sump separated by a thin polymer heat transfer wall, strong solution from the system applied as a falling film to the heat-in side is recirculated, while strong solution applied as a falling film to the heat-out side and evaporation therefrom transported by a vapor compressor to the absorption chamber and condensed for recirculation, the sump solution being being strengthened and delivered to and evaporated in the absorber of the chiller system for maximized chilling of a water distribution system.

48 Claims, 5 Drawing Sheets

ENHANCED LITHIUM BROMIDE ABSORPTION CYCLE WATER VAPOR RECOMPRESSION ABSORBER

This application is a Continuation In Part of application Ser. No. 08/427,852 entitled REFRIGERANT ENHANCER-ABSORBENT CONCENTRATOR AND TURBO-CHARGED ABSORPTION CHILLER, filed Apr. 24, 1995 now U.S. Pat. No. 5,600,967 isued Feb. 11, 1997.

BACKGROUND OF THE INVENTION

This invention relates to Indirect and Direct Fired Absorption (DFA) Chillers and provides Vapor Recompression Absorption (VRA) for reconcentrating an absorbent solution of environmentally acceptable water refrigerant in an aqueous salt solution of Lithium-Bromide or the like, it being a genral object of this invention to lower the useful refrigeration temperature by increasing the efficiency of the absorption process, particularly in a multi-stage apparatus having at least primary and secondary generators for concentrating the absorbent refrigerant-salt solution.

The thermal reaction of water refrigerant is to absorb a large amount of heat when changing from a liquid to a vapor, and conversely to release the same amount of heat when the thermal reaction is reversed. The significant difference between mechanical refrigeration and absorption refrigeration is in the refrigerant used. That is, the costly typical fluorinated hydrocarbon compounds required by vapor compression refrigeration are replaced by a far less costly water absorbent salt solution. The water refrigerant (distilled) with a latent heat of vaporization of approximately 1,000 Btu/lb is stable, non-toxic and readily absorbed, and is easily separated in large volume during the absorption process.

Significantly, absorption refrigeration requires a second fluid, an absorbent such as and preferably Lithium-Bromide, which is a non-toxic salt that has high affinity for water. This high affinity of Lithium-Bromide for the water refrigerant minimizes the volume of water solution that is pumped per pound of refrigerant per se transferred between the absorber and the generator of the apparatus, and at its boiling point is also substantially lighter than that of the water refrigerant, thereby facilitating separation of the refrigerant from the absorbent salt in solution.

The absorbent's affinity for water refrigerant changes with the amount of refrigerant present in the solution. A "dilute" absorbent is one with a high concentration of water refrigerant, and therefore has little affinity for it, and termed a "weak" absorbent. Whereas a "dense" absorbent is one with a low concentration of water refrigerant, and therefore has great affinity for it, and termed a "strong" absorbent or solution thereof. An "intermediate" absorbent solution is partially re-concentrated solution with a moderate affinity. And a "mixed" absorbent solution is a mixture of intermediate and strong solution.

Direct Fired Absorption (DFA) Chillers are well known but have not been widely used in the United States. The DFA concept is based upon traditional absorption principles, similar to the principles of conventional vapor compression refrigeration and very similar to the concept principles of absorption chillers heated with steam and hot water. The direct fired heat aborption concept uses the environmentally compatible combination of water and an absorbent, and substitutes a burner for the conventional steam/hot water generator and auxiliary boiler. Direct fired absorption enjoys high efficiency COP's of 0.9 to 1.1, compared to 0.68 to 1.1 for said conventional two stage steam and/or hot water absorption. Furthermore, the boiler is eliminated and a burner only is required, or as compared to vapor compression refrigeration the burner replaces a mechanical compressor.

Direct fired absorption refrigeration is initiated when higher pressure liquid refrigerant solution from a condenser is discharged through an expansion device and into a lower pressure evaporator and collecs therein. Expansion and "flashing" of the refrigerant solution occurs and said liquid refrigerant is collected in the sump of the evaporator. There is also the transfer of heat into the collected and cooled refrigerant solution, from comparatively warm system water that is pumped through a cooling tower causing the collected refrigerant solution to evaporate and resulting in vapor that is transferred to an absorber where it is absorbed into the Lithium-Bromide refrigerant solution. This process not only creates a low pressure in the absorber that draws a continuous flow of refrigerant from the evaporator to the absorber, but also causes the vapor to condense as it releases the heat of vaporization in the evaporator. This heat together with the heat of dilution produced as the refrigerant condenses and mixes with the aborbent, is transferred into the cooling tower water and is carried out of the absorber. The assimilation of water refrigerant dilutes the Lithium-Bromide refrigerant solution and reduces its affinity for refrigerant vapor. In order to sustain the refrigeration cycle the solution is then reconcentrated by continuously pumping the dilute refrigerant solution from the absorber to a generator where heat is applied to distill the water refrigerant from the absorbent. As the water refrigerant is removed by disillation the reconcentrated Lithium-Bromide refrigerant solution is returned through the absorber and to the generator to resume the absorption process, while the liberated refrigerant vapor from the generator is transferred to the cooler condenser and returned to its liquid state as the cooling tower absorbs the heat of condensation carried by the vapor. The liquid's return from the generator to the expansion device completes the cycle.

It is an object of this invention to increase the volume of water refrigerant applied to the system water evaporator, and simultaneously strengthen the absorbent salt solution applied to the absorber that shares enclosure space with said water system evaporator. In practice, the system water evaporator and said absorber are combined and referred to herein as an evaporator-absorber means that collects low temperature weak absorbent. Accordingly, I provide a unique Vapor Recompression Absorber unit that characterizes this refrigeration concept and functions to concentrate the absorbent solution subject to heat absorption into cooling tower water. The weak absorbent salt solution is collected in the sump of the Vapor Recompression Absorber unit, and is recirculated for evaporation therein and the vapor compressed for adsorption into the salt solution to strengthen the same by concentrating it.

There are three basic types of double effect direct fired absorption systems, identified by their respective cooling solution flow cycles; namely, Series Flow, Parallel Flow and Reverse Flow. In each system the operating fluids are dilute (weak), intermediate, and concentrated (strong) Lithium-Bromide salt solutions plus a refrigerant (water) vapor and liquid. The Vapor Recompression Absorber (VRA) Unit of this invention is compatable with any one of the three basic types of system as it is employed in a closed weak absorbent circuit associated with the system water evaporator-absorber means, independent from either the first or second stage generator. However, heat energy is applied to said closed circuit from a strong absorbent generator. Accordingly, it is an object of this invention to provide said Vapor Recompression Absorber (VRA) Unit for use with a system water evaporator-absorber means circuit of any one of the said three basic double effect direct fired absorption systems. The three basic systems are shown herein to provide chilled system water by operating in a refrigeration mode, however it is to be understood that this does not preclude providing hot water by operating in a heating mode when so required.

Direct fired absorption chillers are characterized by flow control means that reduces the pressure of strong absorbent solution produced by the regeneration that concentrates the Lithium-Bromide absorbent and vaporizes the refrigerant water. Reduction in pressure of the absorbent fluid is required for heat absorption and is usually accomplished by a flow control means in the form of an orifice, an expansion valve or pressure regulation device. Additionally however, it is an object of this invention to reduce and/or regulate the expansion of strong absorbent through the advantageous employment of work producing prime mover means for driving recomprsssion means used in the recirculation of absorbent solution to be separated into enhanced system water and reconcentrated absorbent solution in the Vapor Recompression Absorber Unit herein disclosed. It is another object of this invention to provide an energy recovery blower means, operating at low vapor pressure and providing the pressure drop necessary for effecting the increased cold function of the refrigeration system.

The "enhancer-concentrator unit" as it is disclosed in co-pending application Ser. No. 08/427,852 and now U.S. Pat. No. 5,600,967 is excessively large and cumbersome, due to its association with the Lithium-Bromide solution taken from the low temperature heat exchanger , it being an object of this invention to provide a Vapor Recompression Absorber (VRA) Unit in lieu of said enhancer-concentrator unit whereby unit size, energy use and complexity is reduced, also replacing the costly vapor compression blower or pump by providing a low speed and low pressure, low cost blower operating at slightly increased pressure, on the order of 3 to 6 inches of water gage, all as hereinafter described. By providing this new VRA unit, it is possible to substantially increase absorber performance (COP) by increasing Lithium-Bromide solution concentration to at least the level of that of a second stage concentrator (namely 60.3% or even greater if desired) without increasing the absorber temperature, thereby obtaining a 38° F. (possibly lower) chilled water discharge, and permitting a higher chilled water inlet temperature to the evaporator in order to maintain the COP of the cycle with chilled water discharge temperature reduced by approximately 10° F. as compared with prior art chiller systems. As a result for example, a 15° F. rise of inlet chilled water is attained so that chilled water pumping and piping costs and associated energy use to interconnected cooling loads are reduced by approximately one-third. The latter effect is of high utility since a decrease in chilled water mass flow rate at constant cooling loads increases the temperature differential at the evaporator between chilled water inlet and outlet temperatures, thereby permitting a lower and optimum outlet chilled water temperature for a specified cooling load.

For conventional Lithium-Bromide (LiBr) absorption chiller systems, when comparing system performance (as measured by the Coefficient Of Performance or COP) against costs, the COP will generally increase with increasing heat exchanger area and mass flow rate of the LiBr solution before leveling off. Care must be taken not to increase the absorber operating temperature since its performance will decrease. Also, the solution concentration leaving the second stage concentrator must be maintained below levels that could cause crystallization problems. However, increasing chilled water inlet temperature can also improve COP. Based upon a conventional 10° F. differential between inlet and outlet chilled water temperature, such an upward shift presents a problem for the cooling load served since the resulting chilled water discharge temperature is unable to provide adequate humidity or sensible control without additional and excessive supply air distribution rates, resulting in wasteful fan energy and excessive ductwork and related air distribution costs.

By providing the Vapor Recompression Absorber VRA of the present invention, it becomes possible to increase absorber performance by increasing the LiBr concentration to at least the level of that of a second stage concentrator (namely 60.3% LiBr ) or even greater if so desired, without increasing the absorber temperature and thereby obtain a 38° F. chilled water discharge temperature, and lower. This permits a higher inlet chilled water temperature to the evaporator so as to improve the COP of the system and at the same time permits for example, a 15° F. rise to a 53° F. chilled water inlet temperature, so that the chilled water pumping and piping costs and associated operational costs are reduced approximately one-third.

The COP resulting from the series flow of cooling water from the absorber is improved by supplying the absorber with a separate water supply, which requires a lower heat input to the first stage concentrator. In spite of additional cost associated with additional pumping (first and associated energy use costs) an increased cooling water supply of 10% to 15% increase in overall COP is possible over conventional double effect LiBr chiller systems of the series flow, reverse flow and parallel flow configurations.

SUMMARY OF THE INVENTION

This invention provides refrigerant enhancement by means of a Vapor Recompression Absorber VRA unit that greatly increases the efficiency of direct fired absorption chillers, in any one of the generally recognized types thereof, by increasing the volume of water refrigerant supplying the evaporator at the chilled coils and by simultaneously concentrating the absorbent solution at the heat absorber that removes heat from the system for discharge at a cooling tower or the like. It is the chilling mode of operation with which this invention is concerned, it being a general object to provide a vapor recompression absorber unit that is compatible with and acceptable to existent air conditioning systems of the type under consideration, in either a cooling mode or heating mode as the case by be, and particularly with double effect direct fired absorption chiller systems. The basic principles of direct fired absorption is the use of a fossil fuel burner that heats and hereby produces a strong absorbent solution of Lithium-Bromide and water, and distills therefrom a water vapor refrigerant that is condensed in an evaporator and thereby chills system water that is usefully circulated. The absorbent solution is weakened in the process and heat removed therefrom and eliminated by means of an obsorber that transfers said heat to a cooling tower or the like. The vapor recompression absorber unit of the present invention is employed in circuit with said absorber to remove additional heat from the system and is adaptable to single or double effect systems. This adaptable unit can be retrofitted or constructed as a component in combination with any one of the aforementioned absorption chiller systems.

The foregoing and various other objects and features of this invention will be apparent and fully understood from the following detailed description of the typical preferred forms and applications thereof, throughout which reference is made to the accompanying drawings.

THE DRAWINGS

Figure 1:
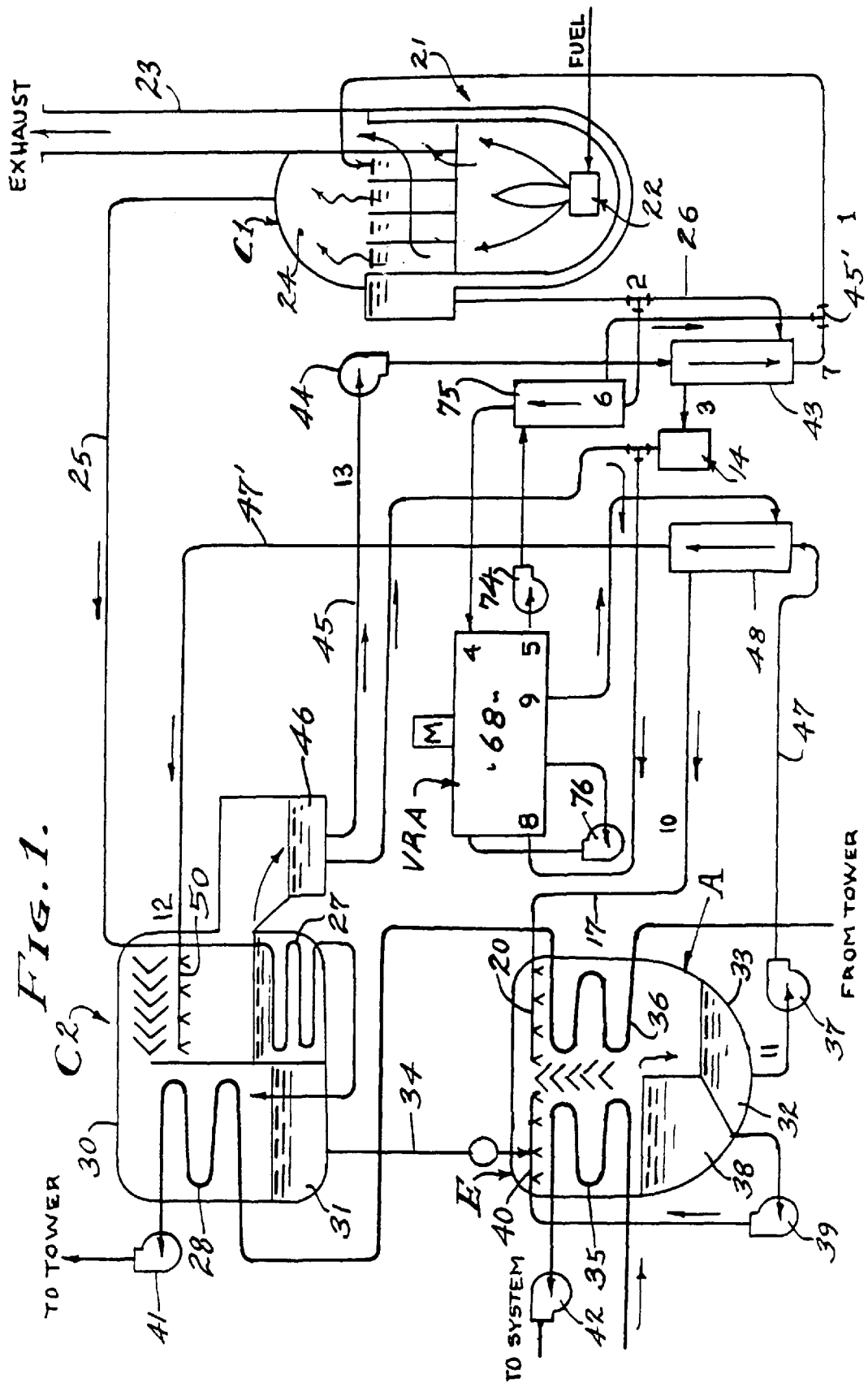
FIG. 1 is a schematic diagram of a reverse flow direct chilled absorption system and the vapor recompression absorber unit combined therein to improve the condition of the refrigerant and the absorbent.
Figure 2:
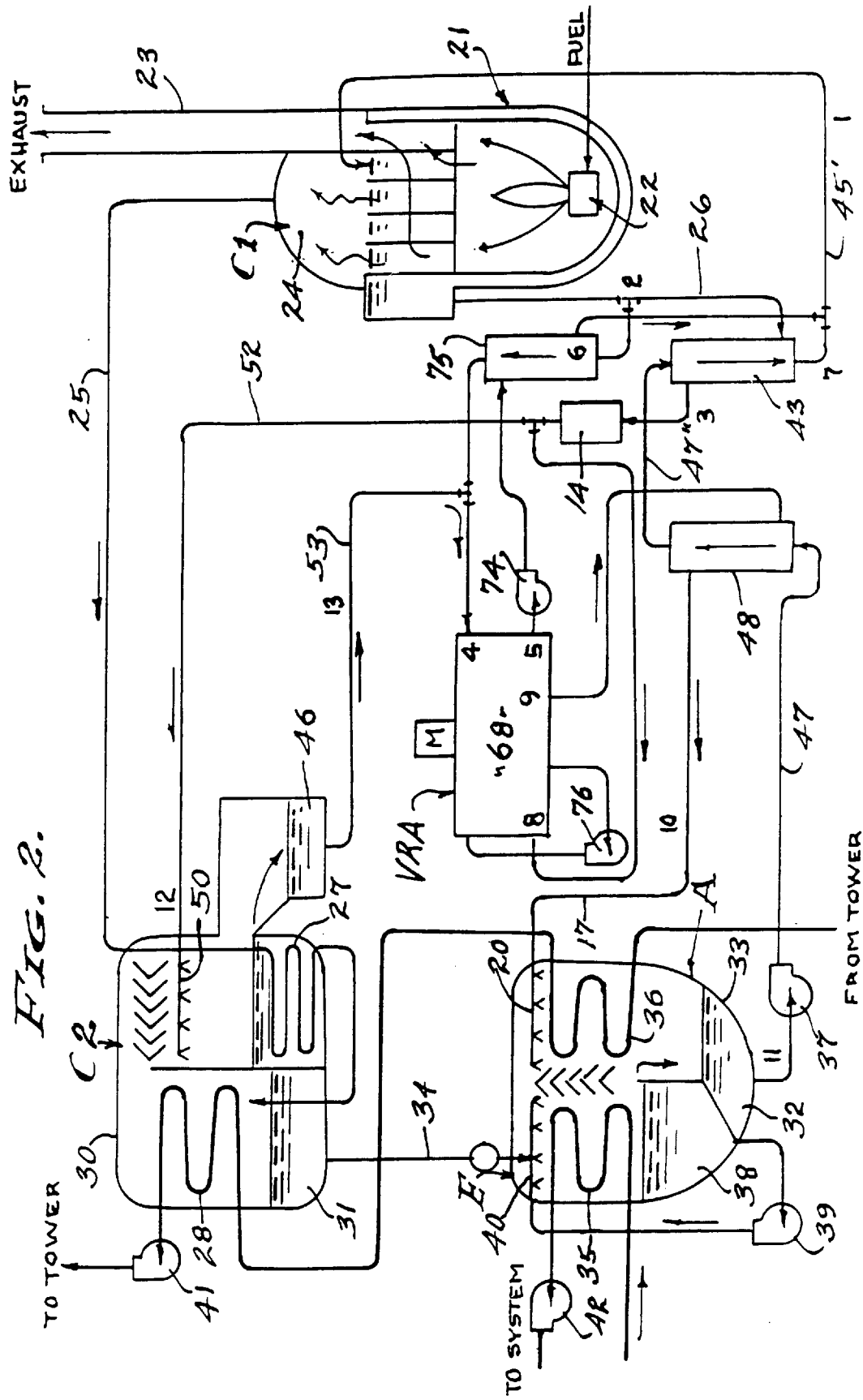
FIG. 2 is a schematic diagram of a series flow direct chilled absorption system and the vapor recompression absorber unit combined therein to improve the condition of the refrigerant and the absorbent.
Figure 3:
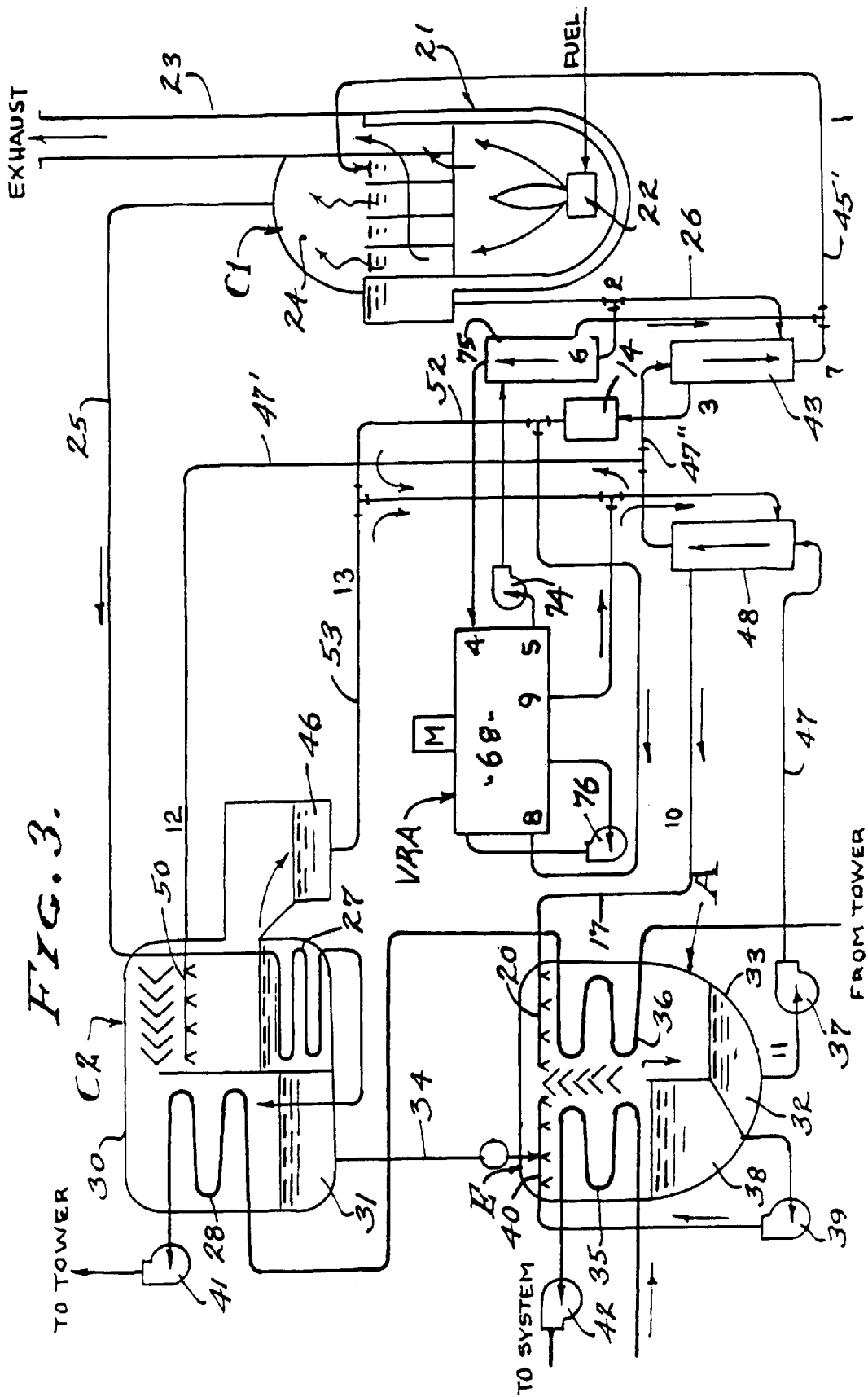
FIG. 3 is a schematic diagram of a parallel flow direct chilled absorption system and the vapor recompression absorber unit combined therein to improve the condition of the refrigerant and the aborbent.
Figure 4:
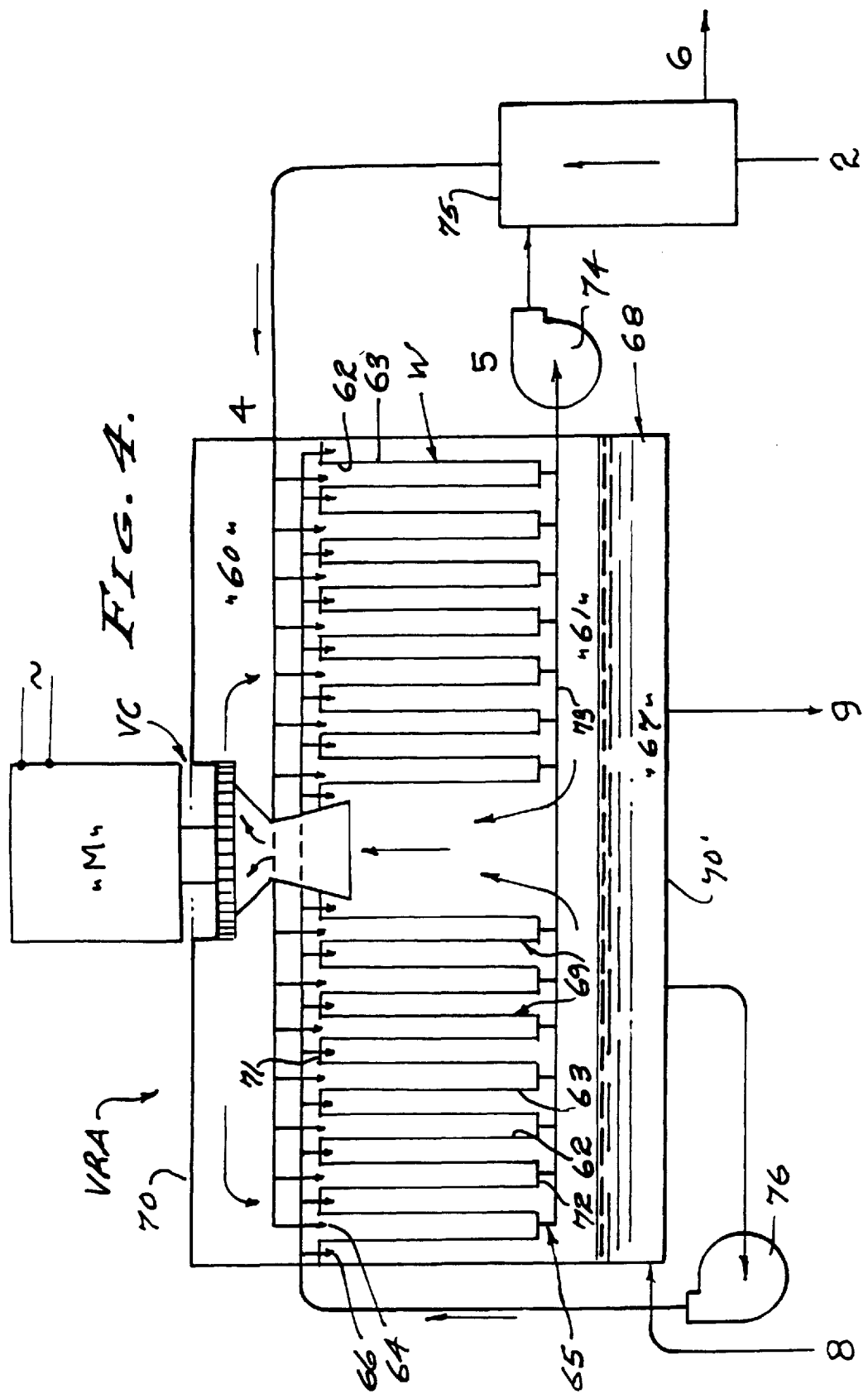

FIG. 4 is an enlarged detailed diagram of the vapor recompression absorber unit adaptable to any one of the absorption systems of FIGS. 1, 2 and 3 and characterized by the transfer of heat through a membrane implemented by low pressure vapor movement, the treated solution emanating from a high temperature source, a portion thereof being recirculated, and a portion thereof being usefully employed to chill system water.

Figure 4A:
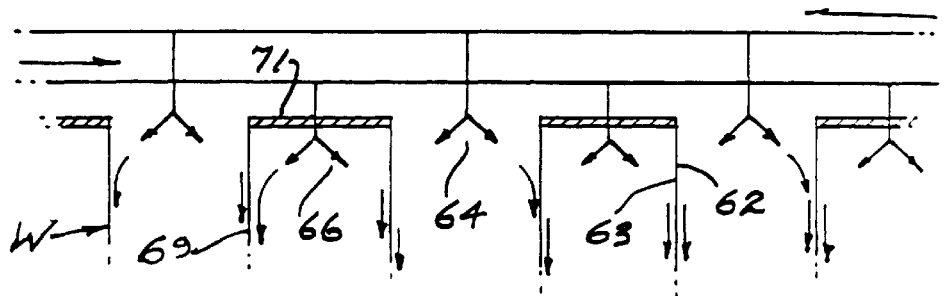

FIG. 4a is an enlarged fragmentary diagram of the heat transfer wall and falling film relationship, as indicated by the arrows.

Figure 5:
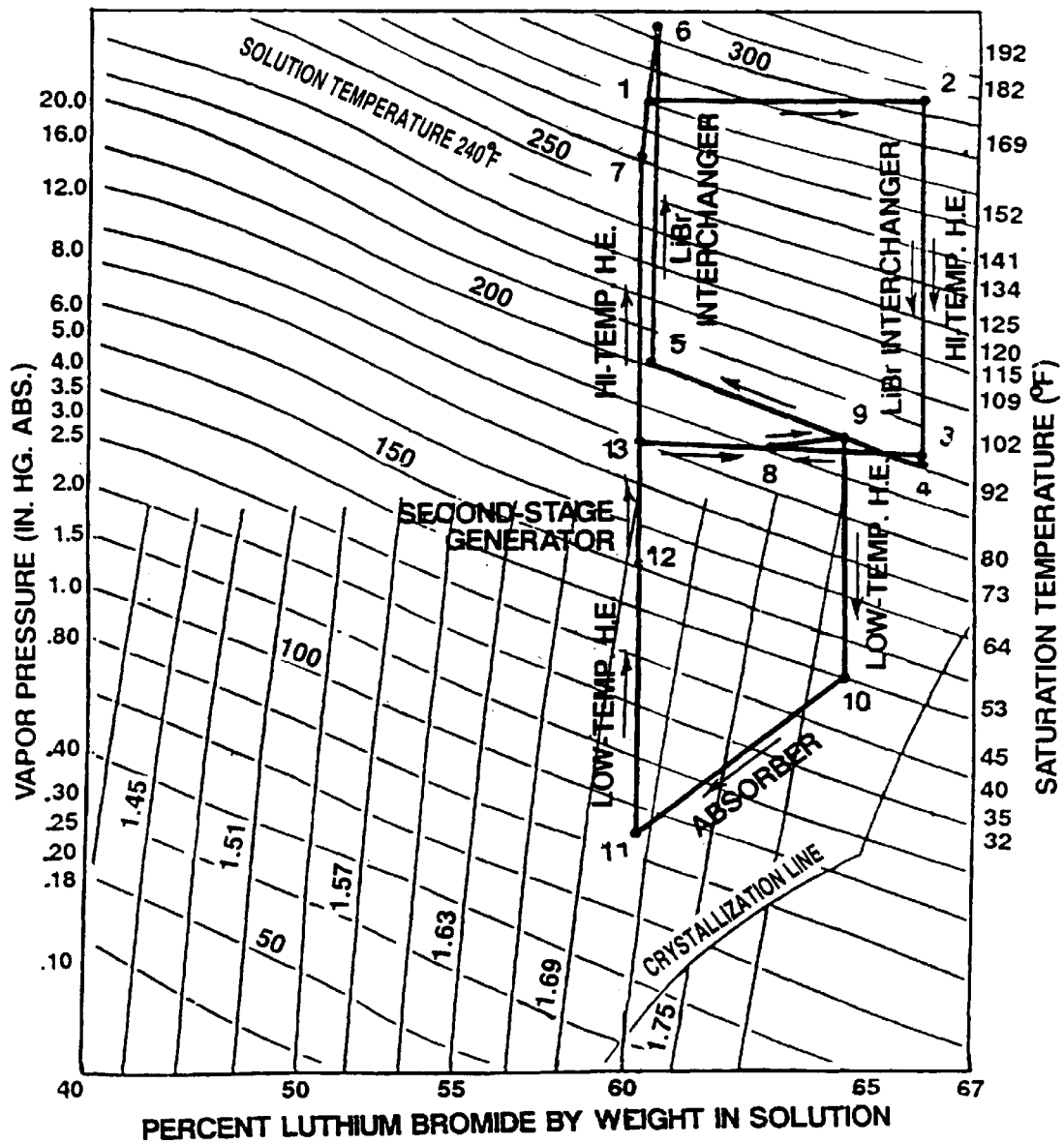

And FIG. 5 is an equilibrium diagram for Lithium-Bromide in the reverse flow system as it is illustrated in FIG. 1.

PREFERRED EMBODIMENT

This invention provides a Vapor Recompression Absorber (VRA) unit which is inserted into a direct fired absorption chiller system in order to enhance the refrigerant and to concentrate the absorbent liquid. The refrigerant is water (distilled) and the absorbent is a salt, preferably Lithium-Bromide (LiBr) soluble in water. It is a basic single effect absorpion system, high pressure concentrated liquid absrbent from a generator passes through a metering device or pressure control and into a low pressure evaporator where it contacts the water tower heat-in coil. The refrigerant is metered into the evaporator which cools the liquid refrigerant and the warmer system water causes the refrigerant to evaporate. The resulting refrigerant vapor is then exposed to the Lithium-Bromide solution in an absorber where it is absorbed due to a large vapor pressure differential between the liquid and the refrigerant vapor and which drives the vapor into solution. As the vapor is absorbed it releases the heat of vaporization acquired in the evaporator. And, this heat together with the heat of dilution is absorbed by coils and discharged by a cooling tower. The weak refrigerant rich solution is collected in a sump and is again processed by the generator which is direct fired and distills the solution to separately provide refrigerant vapor and a reconcentrated lithium-bromide and water solution ready for recycling. The vaporized refrigerant passes through a condenser and returns to the liquid state as the cooling tower water picks up the heat of condensation, and the liquid is collected in the sump and returned to the generator for distilling and reconcentration.

The Vapor Recompression Absorber VRA that I now provide increases the performance of the system by concentrating absorbent solution delivered to line 17 and to spray bar 20 of the absorber A. For example, concentration of liquid absorbent solution is increased to 64.7% at a temperature of 192° F. and delivered through the low temperature heat exchanger 48 to the spray bar 20 as shown. Accordingly, there is a sorbent liquid line 17 that discharges into the absorber A by means of spray bar 20 of the absorption chiller system.

The absorption chiller systems shown herein are double effect systems wherein there are two stages of refrigerant reconcentration of the absorbent solution, a direct fired first stage high temperature high pressure concentrator C1 and a second stage low pressure low temperature concentrator C2. The chilling cycle is driven directly as by a gas or oil burner (or indirect steam application) applied to the first stage concentrator C1 which generates refrigerant water vapor at a relatively higher temperature and pressure, and the heat of condensation is used to drive the second stage C2 operating at a lower temperature and pressure. Accordingly, the refrigerant mass is boiled out of solution in each of the two stages, thereby substantially increasing the net generation of refrigerant and cooling capability per unit of heat input there are inefficiencies, it being accepted that a state of the art double effect system will have a COP of approximately 1.0 whereas a single effect system will have COP of approximately 0.65. With this invention There is a significant increase in the chilling effect by at least 20%, because the volume of the useful refrigerant and the Lithium Bromide concentration is increased.

Referring now to the drawings, each embodiment shown includes a first stage concentrator C1, a second stage concentrator C2, and an evaporator E and absorber A for transferring heat from system water into cooling tower water for discharge to outside atmosphere. The tower is indicated but not shown, nor is the system water distribution shown, both of which are state of the art.

The first stage concentrator C1 is comprised of a boiler 21 fired by a burner 22 with the products of combustion discharged through a stack 23. The heat of combustion is applied to the enclosed weakened refrigerant rich absorbent solution to boil off the liquid refrigerant as a water vapor collected in the header 24 of the boiler and transferred to the second stage concentrator C2 via line 25. The reconcentrated absorbent solution is delivered to the spray bar 20 of the absorption chiller system via line 26; from which line said absorbent solution is further reconcentrated by the Vapor Recompression Absorber VRA hereinafter described.

The second stage concentrator C2 is comprised of a heat transfer coil 27 through which the refrigerant vapor from line 25 is passed, and refrigrant condenser coil 28 which condenses the refrigerant mass. The coil 27 and coil 28 are preferably incorporated in a single vessel 30 and share the same atmosphere therein. The heat transfer coil 27 is subjected to heat transfer from lower temperature weakened absorbent solution from the sump of the absorber A. The condenser coil 28 is in the cooling tower water circuit that removes refrigerant heat of condensation from the chiller system. The refrigerant vapors are thereby combined and the pressure thereof reduced, and mixed vapors combined in the second stage are condensed by the cooling tower coil 28 therein and collected in a sump 31 for discharge into the evaporator E for heat transfer out of the system water. The weakened absorbent solution employed for condensation of refrigerant vapor in the second stage concentrator C2 is collected in the sump 31 for re-entry into the chiller system, which varies in the several embodiments shown as will be described.

The evaporator E and the absorber A are preferably incorporated in a single vessel 33 and share the same atmosphere therein. The above described spray bar 20 discharges liquid absorbent solution into the absorber A section of the vessel 33, while a liquid line 34 discharges second stage refrigerant into the evaporator E section within the vessel 33. The evaporator E section is characterized by a heat-in coil 35 in the system water circuit, while the absorber A section is characterized by a heat-out coil 36 in the cooling tower circuit. The sump 32 of the absorber A section collects weakend absorbent solution which is returned through the system by a pump 37. The sump 38 of the evaporator section collects liquid refrigerant that is recycled over the heat-in coil 35 by means of a pump 39 recirculating refrigerant water from a spray bar 40. Cooling tower water is circulated through the heat-out coil 36 and through the coil 28 of the second stage concentrator C2 by a pump 41. The system water is circulated by a pump 42.

Referring now to the reverse flow embodiment disclosed in FIG. 1 of the drawings, the absorption cycle begins when high temperature high pressure reconcentrated absorbent solution flows through the metering device 14 and through the Vapor Recompression Absorber VRA for discharge by spray bar 20 into the lower pressure evaporator-absorber E-A vessel 33. The lower pressure causes boiling of the refrigerant water from the absorbent solution, by "flashing" into vapor that cools the liquid solution mass. The warmer system water is pumped through coil 35 causing more refrigerant to vaporize, and the remaining refrigerant is collected in the sump 38 and recirculated over coil 35 by spray bar 40 to thereby evaporate more refrigerant. High temperature high pressure reconcentrated absorbent solution from the first stage concentrator C1 is delivered to the metering device 14 through a high temperature heat exchanger 43 that transfers heat into the return of weakened absorbent solution circulated by a pump 44 through a line 45 from the solution collector sump 46 of the second stage concentrator C2. A continuing line 45' feeds the pre-heated weakened solution into the header 24 of the first stage concentrator C1. Low temperature weakened absorbent solution is returned via line 47 through a low temperature heat exchanger 48. And a continuing line 47' from line 47 through heat exchanger 48 discharges from a spray bar 50 into the vapor chamber generator section for heat transfer from coil 27.

Referring now to the series flow embodiment disclosed in FIG. 2 of the drawings, the absorption cycle begins when high temperature high pressure reconcentrated absorbent solution from the first stage concentrator C1 flows through the metering device 14 and through the second stage concentrator C2, and then discharged by spray bar 20 into the lower pressure evaporator-absorber E-A vessel 33. The lower pressure causes boiling of the refrigerant water from the absorbent solution, by "flashing" into vapor that cools the liquid mass. The warmer system water is pumped through coil 35 causing more refrigerant to vaporize, and the remainder water refrigerant is collected in the sump 38 and recirculated over coil 35 by spray bar 40 to thereby evaporate more refrigerant. High temperature high pressure reconcentrated absorbent solution from the first stage concentrator C1 is delivered to the metering device 14 through a high temperature heat exchanger 43 that transfers heat into the return of weakened absorbent solution recycled by pump 37 through line 47 and low temperature heat exchanger 48 to further reduce the temperature of low pressure solution released by the metering device 14, and it is this low temperature low pressure strong absorbent solution that is delivered through the Vapor Recompression Absorber VRA and the evaporator-absorber E-A. via lines 49 and 17. A continuing line 47" from line 47 through the heat exchangers 48 and 43 discharges weakened absorbent solution preheated thereby into the header 24 of the concentrator C1 via the line 45'. Series flow of weakened absorbent from the second stage concentrator C2 is from the sump 46 thereof via line 53 and through the Vapor Recompression Absorber VRA. The discharge of the metering device is from the high temperature heat exchanger 43 through line 52 to the spray bar 50 of the second stage concentrator C2 and through line 52' to the solution sump of the Vapor Recompression Absorber VRA. Accordingly, the volume of refrigerant is enhanced for delivery into the evaporator E, and the absorbent solution is strengthened for delivery into the absorber A, each of these functions increasing the chilling capability of the system.

Referring now to the parallel flow embodiment disclosed in FIG. 3 of the drawings, the absorption cycle begins when high temperature high pressure reconcentrated absorbent solution from the first stage concentrator C1 flows through the metering device 14 and then through the Vapor Recompression Absorber VRA for discharge by spray bar 20 into the low pressure evaporator-absorber E-A vessel 33. The lower pressure causes boiling of the refrigerant water from the absorbent by "flashing" into vapor that cools the liquid solution mass. The warmer system water is pumped through coil 35 causing more refrigerant to vaporize, and the remaining refrigerant is collected in the sump 38 and recirculated over coil 35 by spray bar 41 to thereby evaporate more refrigerant. High temperature high pressure reconcentrated absorbent solution from the first stage concentrator C1 is delivered to the metering device 14 through a high temperature heat exchanger 43 that transfers heat into the return of weakened absorbent solution recycled by pump 37 through line 47 and low temperature heat exchanger 48 to further reduce the temperature of the low pressure solution released by the metering device 14, and it is this low temperature low pressure strong absorbent solution that is delivered through the Vapor Recompression Absorber VRA and to the evaporator-absorber E-A via lines 49 and 17. A continuing line 47" through the heat exchangers 48 and 43 discharges weakened absorbent solution pre-heated thereby into the header 24 of the concentrator C1 via the line 45'. Heat transfer coil 27 of the second stage concentrator C2 is supplied with relatively cool weakened absorbent solution from line 47" from the low temperature heat exchanger 48 via line 47' and through the spray bar 50. Parallel flow of strong absorbent solution from the first stage concentrator C1 is from the metering device 14 and of strengthened absorbent solution from the second stage concentrator C2 rump 46 via line 53 joined with line 52 and continuing as line 53' to the heat exchanger 48. The combined solutions of the two concentrators C1 and C2 is directed through the Vapor Recompression Absorber VRA and to the spray bar 20 of the evaporator-absorber EA. Accordingly, the volume of refrigerant is enhanced for delivery into the evaporator E, and the absorbent solution is strengthened for delivery into the absorber A, each of these features increasing the chilling capability of the system.

Referring now to FIG. 4 of the drawings, the Vapor Recompression Absorber VRA is comprised generally of upper and lower refrigerant vapor chambers 60 and 61 exposed to the opposite side surfaces 62 and 63 of a heat transfer wall W that separates two distinct high and low pressure chambers, and a vapor compressor VC in the form of a low pressure blower that transports refrigerant water vapor generated within the lower vaporizing chamber 61 and into the upper vapor absorption chamber 60. As shown, there is a "falling film absorption" side surface 62 of the wall that is made functional by solution distribution means 64 in the form of a solution controlling weir means or nozzles, there being a solution collection means 65 for accumulating lower Lithium-Bromide concentrations at slightly increased temperature and for recirculating it through the first stage concentrator C1. And, there is a "falling film evaporation" side surface 63 of the wall that is made functional by solution distribution means 66 in the form of a solution controlling weir means or nozzles for recirculating low temperature solution from a sump 67. In practice, large surface areas 62 and 63 are employed and which can be accomplished in various ways such as by using flat sheets of heat transfer material, tubular walls thereof, or by using concentric walls as shown. This circular configuration is compact and highly advantageous for the vapor compressor VC adaptation, and for the solution sump 67 as well, and all of which is incorporated within closed vapor chambers 60 and 61 isolated from each other by a concentric assembly of ring-shaped heat transfer walls in the form of membranes constructed of polymer material of 0.020 to 0.040 mm thickness, such as polypropylene, or polyethylene, or the like.

The Vapor Recompression Absorber VRA is a structural unit adapted to be inserted into the Direct Fired Absorption (DFA) chiller systems using an aqueous salt solution of Lithium-Bromide (LiBr). The preferred chiller systems are of the double effect type as shown herein and having first and second stage concentrators C1 and C2 into which the VRA is connected as shown in either one of FIGS. 1, 2 and 3. The unit configuration is preferably circular and confined within an upstanding cylindrical tank 68 with horizontal top and bottom walls 70 and 70'. The top interior portion of the tank 68 provides the upper vapor absorption chamber 60 while the bottom interior portion of said tank provides the lower refrigerant vapor evaporation chamber 61. Intermediate the two chambers is the imperforate heat transfer wall W that isolates the two chambers one from the other and which provides the opposite side surfaces 62 and 63. Heat transfer is from the side 62 that is exposed to the absorption chamber 60 and to the side 63 that is exposed to the evaporation chamber 61. Below and exposed to the lower evaporation chamber 61 is the sump 67 into which the higher concentration Lithium-Bromide solution precipitates for use in the evaporator E of the chiller system (see FIGS. 1, 2 and 3).

In accordance with the preferred embodiment, there is a multiplicity of radially spaced concentric panels 69 vertically disposed within the tank 68 and extending between the closed chambers 60 and 61. The top and bottom edges of the panels are each in a common plane and are alternately interconnected by top and bottom headers 71 and 72, so that the spaces between adjacent pairs of panels 69 are alternately open to the upper and lower chambers 60 and 61 respectively, thereby closing each chamber and isolating one from the other.

Characteristically, one side of each panel 69 is exposed to one chamber while the opposite side of each panel 69 is exposed to the other chamber. In practice, the headers 71 and 72 are structurally supported within the tank 68 and between which the panels 69 are suspended in the form of polymer membranes or the like, and over which the Lithium-Bromide salt solutions are continuously applied so as to fall by gravity as film contiguous to the panel surface. It will be observed that the high water vapor pressure of incoming solution at 4 is lower than the water vapor pressure of incoming solution at 8. The high temperature high pressure solution at 4 is discharged onto side surface 62, while the recirculated solution from sump 67 is discharged onto side surfaces 63. Both solution discharges at 62 and 63 being at the top perimeter of each panel 69 membrane.

The first stage solution distribution means 64 distributes high temperature high pressure solution onto the side surface 62 of adjacent panels 69 as by nozzles of the distribution means 64 discharging into each upwardly open annulus, the bottoms of which are closed by the headers 72 and interconnected by a manifold 73 for collective recirculation of first stage solution by a pump 74. In practice, the collection of first stage solution at 5 from the VRA pump 74 is for example 60.5% LiBr at 201° which is returned to the first stage concentrator C1 through a heat exchanger 75 at 6 that lowers the solution temperature from 306° F. to 200° F. for discharge into the VRA at 4. The 66% LiBr solution remains unchanged before discharge onto the side surfaces 62.

The second stage solution distribution means 66 distributes low temperature low pressure solution onto the side surfaces 63 of adjacent panels 69, as by nozzles of distribution means 66 discharging into each downwardly open annulus, the bottoms of which are open through the lower vapor chamber 61 and into the sump 67. In practice, the collection of solution from the falling film evaporation within the VRA is 64.7% LiBr at 200° F. which is recirculated by a pump 76 to the nozzles of the distribution means 66.

In accordance with this invention, the refrigerant water vapor from the lower chamber is continuously transferred into the closed upper refrigerant water vapor chamber 60 by the vapor compressor VC in the form of a coaxial blower that draws the vapor upwardly from chamber 61 and discharges centrifugally into the chamber 60 at a discretely increased pressure on the order of 3 to 6 inches of water gage.

OPERATION: Concentrated high temperature high pressure absorbent Lithium-Bromide (LiBr) solution at 66% LiBr at 306° F. is delivered from the first stage concentrator C1 at 2. A first part of this high temperature absorbent solution is delivered through the heat exchanger 75 to the vapor absorption chamber 60 of the VRA. A second part of this high temperature absorbent solution is delivered through said heat exchanger 43 and meter device 14 to the vapor evaporation chamber 61 of the VRA. Heat exchanger 75 reduces the 66% solution temperature to 200° F. at 4 and applied as a falling film to the polymeric heat transfer surface 62 of the polymer panels 69 for absorption and heat transfer to surface 63 where the second part of the absorbent solution is evaporated. The concentrated absorbent solution in the sump 67 is at 64.7% LiBr at 192° F. and is collected in the sump 67, the resulting vapor in chamber 61 from the evaporative surface 63 of the panels 69 being transferred to the absorption chamber 60 by the vapor compressor VC which discretely increases the vapor pressure on the order of 3 to 6 inches water gage. Temperature of the refrigerant water vapor is commensurately increased slightly. The vapor is then absorbed into the falling film of the 66% Lithium-Bromide absorbent solution applied to the surface 62 of the polymer panels 69 where said recompressed water vapor releases the heat of condensation and the heat of solution. The diluted Lithium-Bromide solution collected by the manifold 65 is at 60.5% and discharged at 5 and pumped through the heat exchanger 75 where its temperature is increased to 301° F. at 6 and returned to the first stage concentrator C1. A solution mixture from the high temperature heat exchanger 43 at 3 and from the second stage concentrator C2 at 13 at 63% LiBr/192° F. is supplied at 8 to the sump 67 of the VRA. And, concentrated solution at 64.7% LiBr at 192° F. is delivered from the VRA at 9 under pressure (with or without a pump) and passed through the low temperature heat exchanger 48 and to the spray bar 20 of the evaporator A of the chiller system.

The heat transfer wall membrane of the VRA employs a polymer material of 0.02 to 0.04 mm thickness. The use of non-metallic material makes it possible to build relatively large surface areas at much lower cost than similarly sized metallic surfaces. A useful feature of this polymer material is to greatly reduce the tendency of concentrated solution build-up that can foul the falling film interface. Also, the VRA uses large heat transfer surface areas at vary low pressure differential for vapor re-compression. Operation below atmospheric pressure enables the incoming Lithium-Bromide salt solution to boil at a relatively low temperature, and the heat released by condensation is reused in the same stage for evaporating more solution. Therefore, once the process has started no external heat or energy source is required, other than to operate the vapor compressor VC and the circulation pumps as shown. This low pressure Vapor Recompression Absorber system is cost effective and reduces malfunction.

Having described only the preferred forms and applications of my invention, I do not wish to be limited or restricted to the specific details herein set forth, but wish to reserve to myself any modifications or variations that may appear to those skilled in the art as set forth within the limits of the following claims.

I claim:

1. A water vapor recompression absorber in a closed absorption chiller system comprised of at least one concentrator to which heat is applied to vaporize a water refrigerant and to concentrate an absorbent solution of said water refrigerant and a sorbent material, having compressor means for cooling and liquifying said vaporized water refrigerant, having an evaporator means for chilling said water refrigerant by means of evaporation, there being a heat-in coil from warmer system water that is chilled thereby and which discharges heat to vaporize said water refrigerant, having an absorber for condensing the vaporized refrigerant and for its absorption into the absorbent solution, there being a heat-out coil to pick up and discharge the heat of vaporization and the heat of dilution from the system, and pump means for returning the absorbent solution to the at least one concentrator for recycling through said closed system, the water vapor recompression absorber including, an upper vapor absorption chamber and a lower vapor evaporation chamber, there being a vertically disposed heat transfer wall between and separating the two chambers, pressure means for discharging strong absorbent solution from the system concentrator and onto a heat-in side of the heat transfer wall exposed into the absorption chamber, collection means for recirculating weakened solution from the heat-in side of the heat transfer wall and to the system concentrator, vapor compressor means for transporting refrigerant vapor from the evaporation chamber and into the absorption chamber at increased pressure while lowering vapor pressure in the evaporation chamber, there being a sump open from the evaporation chamber for collection of strong solution, pump means for discharging the strong solution from the sump and onto the heat-out side of the heat transfer wall exposed to the evaporation chamber, and a strong absorbent solution line from the sump discharging into the absorber of the chiller system, whereby the chilling effect applied to the heat-in coil of the chiller system is maximized.

2. The vapor recompression absorber and chiller system as set forth in claim 1, wherein the absorbent material is a Lithium-Bromide (liBr) salt.

3. The vapor recompression absorber and chiller system as set forth in claim 1, wherein the upper absorption chamber, the lower vapor evaporation chamber and the sump open from the evaporation chamber are all incorporated within a common tank.

4. The vapor recompression absorber and chiller system as set forth in claim 3, wherein said two chambers are separated by a multiplicity of panels forming said heat transfer wall.

5. The vapor recompression absorber and chiller system as set forth in claim 3, wherein said two chambers are separated by a concentric assembly of ring-shaped panels forming said heat transfer wall interconnected by top and bottom headers with spaces between said adjacent pairs of panels and alternately open into the upper and lower chambers.

6. The vapor recompression absorber and chiller system as set forth in claim 5, wherein the collection means for recirculating weakened solution is connected to said bottom headers by a manifold for said recirculation of solution to the system concentrator.

7. The vapor recompression absorber and chiller system as set forth in claim 1, wherein the heat transfer wall is a panel of polymer material.

8. The vapor recompression absorber and chiller system as set forth in claim 1, wherein the heat transfer wall is a thin membrane of polymer material.

9. The vapor recompression absorber and chiller system as set forth in claim 1, wherein the heat transfer wall is a polymer membrane of a thickness ranging from 0.02 to 0.04 mm.

10. The vapor recompression absorber and chiller system as set forth in claim 1, wherein the means for discharging solution onto the heat-in and heat-out sides of the heat transfer wall are weir means, the solutions being applied to the sides of the wall as falling films.

11. The vapor recompression absorber and chiller system as set forth in claim 1, wherein the vapor compressor means is a low pressure blower open from the evaporation chamber and into the absorption chamber.

12. The vapor recompression absorber and chiller system as set forth in claim 11, wherein the vapor compressor means blower operates at a pressure on the order of 3 to 6 inches water gage.

13. A water vapor recompression absorber in a closed system for increasing the chilling capacity of a double effect reverse flow absorption chiller comprised of a first stage high temperature concentrator to which heat is applied to vaporize a water refrigerant and to concentrate a strong absorbent solution of said water refrigerant and a sorbent material , having a high temperature heat exchanger in a return line of weakened absorbent solution to said first stage concentrator and transferring heat of a strengthened absorbent solution concentrated by said first stage concentrator and into said return line of weakened absorbent solution, having a second stage concentrator with a condenser vapor chamber and sump for cooling and liquifying said vaporized water refrigerant, having an evaporator with a vapor chamber for chilling said water refrigerant by means of evaporation, having a low temperature heat exchanger in a line of the second stage absorbent solution joined by the first stage absorbent solution and transferring heat therefrom and into a return line of weakened absorbent solution and discharging into said evaporator vapor chamber, there being a heat-in coil from warmer system water that is chilled in said evaporator vapor chamber and which discharges heat to vaporize said water refrigerant, having an absorber for reducing water vapor pressure and with a vapor chamber and sump for water vapor absorption into the absorbent solution, there being a first heat-out coil in the absorber vapor chamber to pick up and discharge the heat of dilution, there being a second heat-out coil in the second stage concentrator and in series with said first heat-out coil to pick up and discharge the heat of condensation from the first stage concentrator, and pump means for returning the absorbent solution from the absorber sump and through said return line and to the first stage concentrator for recycling through said closed system, the water vapor recompression absorber including, an upper vapor absorption chamber and a lower vapor evaporation chamber, there being a vertically disposed heat transfer wall between and separating the two chambers, pressure means for discharging strong absorbent solution from the first stage high temperature concentrator and into a heat-in side of the heat transfer wall exposed into the absorption chamber, collection means for recirculating weakened solution from the heat-in side of the heat transfer wall and to the first stage concentrator, vapor compressor means for transporting refrigerant vapor from the evaporation chamber and into the absorption chamber at increased pressure while lowering vapor pressure in the evaporation chamber, there being a sump open from the evaporation chamber for collection of strong solution, pump means for discharging the strong solution from the sump and onto the heat-out side of the heat transfer wall exposed to the evaporation chamber, and a strong absorbent solution line from the sump and through the low temperature heat exchanger and discharging into the absorber of the chiller system, whereby the chilling effect applied to the heat-in coil of the chiller system is maximized.

14. The vapor recompression absorber and chiller system as set forth in claim 13, wherein the absorbent material is a Lithium-Bromide (LiBr) salt.

15. The vapor recompression absorber and chiller system as set forth in claim 13, wherein the upper absorption chamber, the lower vapor evaporation chamber and the sump open from the evaporation chamber are all incorporated within a common tank.

16. The vapor recompression absorber and chiller system as set forth in claim 13, wherein said two chambers are separated by a multiplicity of panels forming said heat transfer wall.

17. The vapor recompression absorber and chiller system as set forth in claim 15, wherein said two chambers are separated by a concentric assembly of ring-shaped panels forming said heat transfer wall interconnected by top and bottom headers with spaces between said adjacent pairs of panels and alternately open into the upper and lower chambers.

18. The vapor recompression absorber and chiller system as set forth in claim 17, wherein the collection means for recirculating weakened solution is connected to said bottom headers by a manifold for said recirculation of solution to the first stage concentrator.

19. The vapor recompression absorber and chiller system as set forth in claim 13, wherein the heat transfer wall is a panel of polymer material.

20. The vapor recompression absorber and chiller system as set forth in claim 13, wherein the heat transfer wall is a thin membrane of polymer material.

21. The vapor recompression absorber and chiller system as set forth in claim 13, wherein the heat transfer wall is a polymer membrane of a thickness ranging from 0.02 to 0.04 mm.

22. The vapor recompression absorber and chiller system as set forth in claim 13, wherein the means for discharging solution onto the heat-in and heat-out sides of the heat transfer wall are weir means, the solutions being applied to the sides of the wall as falling films.

23. The vapor recompression absorber and chiller system as set forth in claim 17, wherein the vapor compressor means is a low pressure blower open from the evaporation chamber and into the absorption chamber.

24. The vapor recompression absorber and chiller system as set forth in claim 23, wherein the vapor compressor means blower operates at a pressure on the order of 3 to 6 inches water gage.

25. A water vapor recompression absorber in a closed system for increasing the chilling capacity of a double effect series flow absorption chiller comprised of a first stage high temperature concentrator to which heat is applied to vaporize a water refrigerant and to concentrate strong absorbent solution of said water refrigerant and a sorbent material, having a high temperature heat exchanger in a return line of weakened absorbent solution to said first stage concentrator and transferring heat of a strengthened absorbent solution concentrated by said first stage concentrator and into said return line of weakened absorbent, having a second stage concentrator with a condenser vapor chamber and sump for cooling and liquifying said vaporized water refrigerant, having an evaporator with a vapor chamber for chilling said water refrigerant by means of evaporation , having a low temperature heat exchanger in a series line of the second stage absorbent solution and transferring heat therefrom and into a return line of weakened absorbent solution in a series line through said high temperature heat exchanger, there being a heat-in coil from warmer system water that is chilled in said evaporator vapor chamber and which discharges heat to vaporize said water refrigerant having an absorber for reducing water vapor pressure and with a vapor chamber and sump for water vapor absorption into the absorbent solution, there being a first heat-out coil in the absorber vapor chamber to pick up and discharge the heat of dilution, there being a second heat-out coil in the second stage concentrator and in series with said first heat-out coil to pick up and discharge the heat of condensation from the first stage concentrator, and pump means for returning the absorbent solution from the absorber sump and through said return line in series through the low and high temperature heat exchangers and to the first stage concentrator for recycling through said closed system, the water vapor recompression absorber including, an upper vapor absorption chamber and a lower vapor evaporation chamber, there being a vertically disposed heat transfer wall between and separating the two chambers, pressure means for discharging strong absorbent solution from the first stage high temperature concentrator and onto a heat-in side of the heat transfer wall exposed into the absorption chamber, collection means for recirculating weakened solution from the heat-in side of the heat transfer wall and to the first stage concentrator, vapor compressor means for transporting refrigerant vapor from the evaporation chamber and into the absorption chamber at increased pressure while lowering vapor pressure in the evaporation chamber, there being a sump open from the evaporation chamber for collection of strong solution, pump means for discharging the strong solution from the sump and onto the heat-out side of the heat transfer wall exposed to the evaporation chamber, and a strong absorbent solution line from the sump and through the low temperature heat exchanger and discharging into the absorber of the chiller system, whereby the chilling effect applied to the heat-in coil of the chiller system is maximized.

26. The vapor recompression absorber and chiller system as set forth in claim 25, wherein the absorbent material is a Lithium-Bromide (LiBr) salt.

27. The vapor recompression absorber and chiller system as set forth in claim 25, wherein the upper absorption chamber, the lower vapor evaporation chamber and the sump open from the evaporation chamber are all incorporated within a common tank.

28. The vapor recompression absorber and chiller system as set forth in claim 27, wherein said two chambers are separated by a multiplicity of panels forming said heat transfer wall.

29. The vapor recompression absorber and chiller system as set forth in claim 27, wherein said two chambers are separated by a concentric assembly of ring-shaped panels forming said heat transfer wall interconnected by top and bottom headers with spaces between said adjacent pairs of panels and alternately open into the upper and lower chambers.

30. The vapor recompression absorber and chiller system as set forth in claim 29, wherein the collection means for recirculating weakened solution is connected to said bottom headers by a manifold for said recirculation of solution to the high temperature concentrator.

31. The vaper recompression absorber and chiller system as set forth in claim 25, wherein the heat transfer wall is a panel of polymer material.

32. The vapor recompression absorber and chiller system as set forth in claim 25, wherein the heat transfer wall is a thin membrane of polymer material.

33. The vapor recompression absorber and chiller system as set forth in claim 25, wherein the heat transfer wall is a polymer membrane of a thickness ranging from 0.02 to 0.04 mm.

34. The vapor recompression absorber and chiller system as set forth in claim 25, wherein the means for discharging solution onto the heat-in and heat-out sides of the heat transfer wall are weir means, the solutions being applied to the sides of the wall as falling films.

35. The vapor recompression absorber and chiller system as set forth in claim 25, wherein the vapor compressor means is a low pressure blower open from the evaporation chamber and into the absorption chamber.

36. The vapor recompression absorber and chiller system as set forth in claim 35, wherein the vapor compressor means blower operates at a pressure on the order of 3 to 6 inches water age.

37. A water vapor recompression absorber in a closed system for increasing the chilling capacity of a double effect parallel flow absorption chiller comprised of a first stage high temperature concentrator to which heat is applied to vaporize a water refrigerant and to concentrate a strong absorbent solution of said water refrigerant and a sorbent material, having a high temperature heat exchanger in a return line of weakened absorbent solution to said first stage concentrator and transferring heat of a strengthened absorbent solution concentrated by by said first stage concentrator and into said return line of weakened absorbent solution, having a second stage concentrator with a condenser vapor chamber and sump for cooling and liquifying said vaporized water refrigerant, having an evaporator with a vapor chamber for chilling said water refrigerant by means of evaporation, having a low temperature heat exchanger in a parallel line of the second stage absorbent solution joined by a first stage absorbent solution and transferring heat therefrom and into the return line of weakened absorbent solution, there being a heat-in coil from warmer system water that is chilled in said evaporator vapor chamber, and which discharges heat to vaporize said water refrigerant, having an absorber for reducing water vapor pressure and with a vapor chamber and sump for water vapor absorption into the absorbent solution, there being a first heat-out coil in the absorber vapor chamber to pick up and discharge the heat of dilution, there being a second heat-out coil in the second stage concentrator and in series with said first heat-out coil to pick up and discharge the heat of condensation from the first stage concentrator, and pump means for returning the absorbent solution from the absorber sump and through said return line in series through the low and high temperature heat exchangers and to the first stage concentrator for recycling through said closed system, the water vapor recompression absorber including, an upper vapor absorption chamber and a lower vapor evaporation chamber, there being a vertically disposed heat transfer wall between and separating the two chambers, pressure means for discharging strong absorbent solution from the first stage high temperature concentrator and onto a heat-in side of the heat transfer wall exposed into the absorption chamber, collection means for recirculating weakened solution from the heat-in side of the heat transfer wall and to the first stage concentrator, vapor compressor means for transporting refrigerant vapor from the evaporation chamber and into the absorption chamber at increased pressure while lowering vapor pressure in the evaporation chamber, there being a sump open from the evaporation chamber for collection of strong solution, pump means for discharging the strong solution from the sump and onto the heat-out side of the heat transfer wall exposed to the evaporation chamber, and a strong absorbent solution line from the sump and through the low temperature heat exchanger and discharging into the absorber of the chiller system, whereby the chilling effect applied to the heat-in coil of the chiller system is maximized.

38. The vapor recompression absorber and chiller system as set forth in claim 37, wherein the absorbent material is a Lithium-Bromide (LiBr) salt.

39. The vapor recompression absorber and chiller system as set forth in claim 37, wherein the upper absorption chamber, the lower vapor evaporation chamber and the sump open from the evaporation chamber are all incorporated within a common tank.

40. The vapor recompression absorber and chiller system as set forth in claim 39, wherein said two chambers are separated by a multiplicity of panels forming said heat transfer wall.

41. The vapor recompression absorber and chiller system as set forth in claim 39, wherein said two chambers are separated by a concentric assembly of ring-shaped panels forming said heat transfer wall interconnected by top and bottom headers with spaces between said adjacent pairs of panels and alternately open into the upper and lower chambers.

42. The vapor recompression absorber and chiller system ass set forth in claim 41, wherein the collection means for recirculating weakened solution is connected to said bottom headers by a manifold for said recirculation of solution to the system concentrator.

43. The vapor recompression absorber and chiller system as set forth in claim 37, wherein the heat transfer wall is a panel of polymer material.

44. The vapor recompression absorber and chiller system as set forth in clam 37, wherein the heat transfer wall is a thin membrane of polymer material.

45. The vapor recompression absorber and chiller system as set forth in claim 37, wherein the heat transfer wall is a polymer membrane of a thickness ranging from 0.20 to 0.40 mm.

46. The vapor recompression absorber and chiller system as set forth in claim 37, wherein the means for discharging solution onto the heat-in and heat-out sides of the heat transfer wall are weir means, the solutions being applied to the sides of the wall as falling films.

47. The vapor recompression absorber and chiller system as set forth in claim 37, wherein the vapor compressor means is a low pressure blower open from the evaporation chamber and into the absorption chamber.

48. The vapor recompression absorber and chiller system as set forth in claim 47, wherein the vapor compressor means blower operates at a pressure on the order of 3 to 6 inches water gage.

* * * * *